United States Patent
Mazzocco et al.

(10) Patent No.: US 9,446,522 B2
(45) Date of Patent: Sep. 20, 2016

(54) PRESENCE SENSING AND POSITION CORRECTION FOR WAFER ON A CARRIER RING

(71) Applicants: John Mazzocco, San Jose, CA (US); Daniel Greenberg, San Jose, CA (US)

(72) Inventors: John Mazzocco, San Jose, CA (US); Daniel Greenberg, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 19 days.

(21) Appl. No.: 14/703,855

(22) Filed: May 4, 2015

(65) Prior Publication Data
US 2015/0336275 A1 Nov. 26, 2015

Related U.S. Application Data

(63) Continuation of application No. 14/285,560, filed on May 22, 2014, now Pat. No. 9,026,244.

(51) Int. Cl.
| | |
|---|---|
| *G06F 7/00* | (2006.01) |
| *B25J 9/16* | (2006.01) |
| *B25J 15/00* | (2006.01) |
| *G06T 7/00* | (2006.01) |
| *G06T 7/60* | (2006.01) |
| *G05B 19/401* | (2006.01) |

(52) U.S. Cl.
CPC ............ *B25J 9/1697* (2013.01); *B25J 9/1612* (2013.01); *B25J 15/0014* (2013.01); *G05B 19/401* (2013.01); *G06T 7/0004* (2013.01); *G06T 7/606* (2013.01); *G06T 7/608* (2013.01); *G05B 2219/37002* (2013.01); *G05B 2219/37608* (2013.01); *G06T 2207/10004* (2013.01); *G06T 2207/30164* (2013.01); *Y10S 901/02* (2013.01); *Y10S 901/46* (2013.01); *Y10S 901/47* (2013.01)

(58) Field of Classification Search
USPC .......................................................... 700/229
See application file for complete search history.

(56) References Cited

U.S. PATENT DOCUMENTS

| | | | |
|---|---|---|---|
| 5,153,409 A | 10/1992 | Rudaitis et al. | |
| 6,135,854 A * | 10/2000 | Masumura | B24B 37/08 451/291 |
| 6,629,053 B1 * | 9/2003 | Mooring | G05B 19/401 702/149 |
| 7,433,759 B2 * | 10/2008 | Nangoy | H01L 21/681 198/394 |
| 2010/0274447 A1 | 10/2010 | Stumpf | |
| 2011/0245964 A1 | 10/2011 | Sullivan et al. | |
| 2013/0226344 A1 | 8/2013 | Wong et al. | |
| 2014/0069459 A1 * | 3/2014 | Guan | H05H 1/24 134/1.1 |

* cited by examiner

*Primary Examiner* — Kyle Logan
(74) *Attorney, Agent, or Firm* — Blakely Sokoloff Taylor & Zafman LLP

(57) ABSTRACT

Embodiments of the invention include apparatuses and systems for determining the position of a carrier ring assembly supported by an end effector. In an embodiment, the position of the carrier ring assembly is determined by passing the carrier ring assembly through a plurality of through beam sensors. As the carrier ring passes through the sensors, a plurality of sensor transitions along points on the carrier ring assembly are detected. Each sensor transition indicates that one of the through beam sensors changed from an unblocked state to a blocked state, or changed from an blocked state to an unblocked state. The position of the end effector is recorded at each sensor transition and is associated with the sensor transition that caused the end effector position to be recorded. A position of the carrier ring assembly is then calculated from the plurality of sensor transitions and their associated end effector positions.

20 Claims, 13 Drawing Sheets

PRESENCE SENSING AND POSITION CORRECTION FOR WAFER ON A CARRIER RING

CROSS-REFERENCE TO RELATED APPLICATIONS

This is a Continuation application of Ser. No. 14/285,560, filed on May 22, 2014, entitled "PRESENCE SENSING AND POSITION CORRECTION FOR WAFER ON A CARRIER RING", which is presently pending, the entire contents of which is hereby incorporated by reference in its entirety for all purposes.

BACKGROUND

1) Field

Embodiments of the present invention pertain to the field of semiconductor processing and, in particular, to methods and apparatuses for correcting the position of a substrate on a carrier ring.

2) Description of Related Art

In a processing tool substrates are transferred from a first location to a second location by wafer handling robots. For example, an atmospheric wafer handling robot in a factory interface may transfer a substrate from a front opening unified pod (FOUP) to a load lock within the processing tool. A second wafer handling robot within a portion of the processing tool under a vacuum may transfer a substrate from the load lock to a processing chamber, such as a plasma etching or deposition chamber. Both the atmospheric wafer handling robot and the vacuum wafer handling robots pick up the substrate with an end effector. When the end effector lifts the substrate up off of a supporting structure, the location of the substrate relative to the end effector is not precisely known. In order for the wafer handling robot to adjust for potential misalignment when placing the substrate at a second position, the center point of the substrate needs to be calculated.

Points along the circumference of the substrate are determined by passing the substrate through sensors and calculating a best fit circle that can be fitted to the points, thereby providing the location of the center point. However, when the substrate does not have a constant radius, center finding processes may not provide sufficient information to determine a center point of the substrate. Additionally, when the substrate is circular, such as a semiconductive wafer, the rotational orientation of the substrate is not critical for passing the substrate through an opening. In contrast, when the substrate does not have a constant diameter, the rotational orientation of the substrate becomes critical. For example, if such a substrate is improperly oriented when attempting to pass it through an opening, then the diameter of the substrate may be greater than the opening and not fit.

SUMMARY

Embodiments of the invention include systems and methods for determining the position of a carrier ring assembly supported by an end effector and correcting the alignment of the carrier ring assembly.

According to an embodiment, a carrier ring assembly is transferred from a first location to a second location. The method includes lifting the carrier ring assembly from a first location with an end effector. The method further includes passing the carrier ring assembly through a plurality of through beam sensors. A plurality of sensor transitions along points on the carrier ring assembly are detected. Each sensor transition indicates that one of the plurality of through beam sensors changed from an unblocked state to a blocked state, or from a blocked state to an unblocked state. The method further includes recording a position of the end effector at each sensor transition and associating the recorded end effector position with the sensor transition that caused the end effector position to be recorded. In an embodiment, a position of the carrier ring assembly is calculated with the plurality of sensor transitions and their associated end effector positions. In an embodiment, a corrective movement for the end effector is calculated based on the position of the carrier ring assembly.

DETAILED DESCRIPTION

Figure 1A:
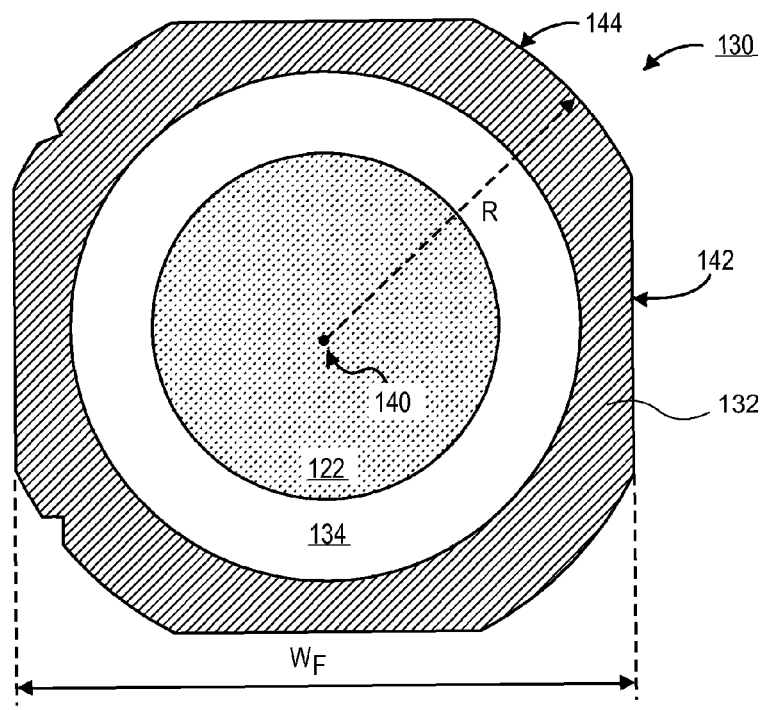
FIG. 1A illustrates a plan view of a carrier ring assembly, in accordance with an embodiment of the invention.

Methods and apparatuses used for presence sensing and position correction for a wafer on a carrier ring are described in accordance with various embodiments. In the following description, numerous specific details are set forth, such as substrates supported by a substrate carrier, FOUPs, end effectors, and semiconductor processing tools, in order to provide a thorough understanding of embodiments of the present invention. It will be apparent to one skilled in the art that embodiments of the present invention may be practiced without these specific details. In other instances, well-known aspects are not described in detail in order to not unnecessarily obscure embodiments of the invention. Furthermore, it is to be understood that the various embodiments shown in the Figures are illustrative representations and are not necessarily drawn to scale.

When a carrier ring assembly is picked up by an end effector, the carrier ring assembly may not always be properly oriented. Accordingly, when the end effector delivers the carrier ring assembly to a second location, the carrier ring assembly may be misaligned. In some instances, misalignment may reduce the effectiveness of processing operations used to process the substrate supported by the carrier ring. For example, a misaligned carrier ring assembly that is processed in a plasma chamber may not be properly oriented under a shadow ring. As such, the adhesive backing tape that supports the substrate may be damaged. Even when the carrier ring is properly oriented, the substrate supported by the carrier ring may be misaligned. For example, when the substrate is placed on the adhesive backing tape, it may be misaligned. When the substrate is misaligned, the carrier ring may need to be placed on a chuck with an offset in order to ensure that the substrate is properly centered in a processing tool. Additionally, a carrier ring assembly that is misaligned in an angular orientation about the center point of the carrier ring may not fit through narrow slots, such as a slot in a FOUP or a load lock.

Accordingly, embodiments of the invention include methods and apparatuses for determining the position of carrier ring assembly with respect to an end effector and adjusting the position of the end effector to account for the misalignment. In embodiments of the invention, the center point of the carrier ring may be found, the angular rotation of the carrier ring may be found, the center point of the substrate supported by the carrier ring may be found, or any combination thereof may be found. As such, the position of the end effector can be corrected to avoid problems, such as those described above, that result when misalignment occurs.

Furthermore, embodiments of the invention determine the position of the carrier ring assembly while the carrier ring assembly is being transferred between locations. As such, embodiments of the invention allow for improved alignment without reducing the throughput of a processing tool. For example, as a carrier ring assembly is transferred between locations, the end effector will pass the carrier ring assembly through a position detection system which registers sensor transitions whenever an edge of the carrier ring assembly passes through a sensor. In an embodiment the location of the end effector is also recorded when a sensor transition occurs. Embodiments of the invention, may then use the sensor transitions and associated end effector positions in conjunction with local center finding techniques to determine the position of the carrier ring assembly. In accordance with embodiments of the invention, the center point of the carrier ring assembly, may be determined when sensor transitions occur on a curved edge of the carrier ring assembly. In accordance with embodiments of the invention, the center point of the substrate may be determined when sensor transitions occur on the edge of the substrate. In accordance with embodiments of the invention, the angular rotation of the carrier ring assembly may be determined when the sensor transitions occur along a flat edge of the carrier ring assembly.

Referring now to FIG. 1, a carrier ring assembly 130 is shown according to an embodiment. In an embodiment, the carrier ring assembly 130 includes a carrier ring 132, an adhesive backing tape 134 and a substrate 122. The layer of adhesive backing tape 134 is surrounded by the carrier ring 132. The substrate 122 is supported by the backing tape 134. In an embodiment, the carrier ring 132 is a metallic material. For example, the carrier ring 132 is a stainless steel. Embodiments include a carrier ring 132 that is formed from a magnetic material. In an additional embodiment, the carrier ring 132 is a non-metallic material, such as a plastic or a resin based material. In an embodiment, the substrate 122 is a commercially available silicon wafer, such as a 300 mm silicon wafer. Additional embodiments include a carrier ring assembly 130 sized for carrying a larger or smaller substrate, such as 200 mm or 450 mm substrates. Substrate 122 may have a plurality of individual device dies (not shown) that each include integrated circuitry formed thereon.

While specific reference is made herein to carrier ring assemblies 130 that include substrates 122 that are wafers, embodiments are not so limited. Substantially similar methods and apparatuses to those described herein may be used to identify and correct the position of the carrier ring assemblies 130 that support substrates other than silicon wafers. For example, carrier ring assemblies 130 for carrying multiple substrates may be utilized according to embodiments of the invention. For example, the position of a carrier ring assembly 130 utilized for processing light emitting diodes (LEDs) formed on a plurality of sapphire substrates may be identified and corrected according to embodiments of the invention.

In an embodiment, carrier ring 132 has one or more flat edges 142. As shown in FIG. 1A, the carrier ring 132 includes four flat edges 142. In an embodiment, the width of the carrier ring 132 between opposing flat edges $W_F$ is approximately 380 mm, though embodiments are not limited to such configurations. For example, a carrier ring 132 for carrying a larger substrate 122 may have a width $W_F$ greater than 380 mm. Embodiments include a carrier ring 132 that has curved edges 144 that are formed between flat edges 142. In an embodiment, the curved edges 144 are circular arcs with an origin at the center 140 of the carrier ring assembly 130. In an embodiment the radius R of the rounded edges 144 may be approximately 200 mm, though embodiments are not limited to such configurations. For example, a carrier ring 132 for carrying a larger substrate 122 may have rounded edges 144 that have a radius R greater than 200 mm. Accordingly, the width of the carrier ring 132 is variable depending on the angular orientation about the center point 140. For example, the width between two points on opposite sides of the carrier ring 132 along the rounded edges 144 (i.e., 2R) is larger than the width $W_F$ between two flat edges 142.

The difference in the widths presents additional problems that are not encountered in substantially circular substrates. For example, an opening in a FOUP or a slot opening into a load lock or a process chamber may be sized to receive a carrier ring 132 that is oriented such that its narrowest width (i.e., $W_F$ between the flat edges 142) fits through the FOUP opening. Accordingly, when transferring a carrier ring assembly 130 from a first location to a second location, the robot transferring the carrier ring assembly 130 needs to know the location and orientation of the carrier ring assembly 130 with respect to the end effector that is supporting the carrier ring assembly 130. When the offset is determined, the robot can adjust the position of the end effector in order to align the carrier ring assembly 130.

Figure 1B:
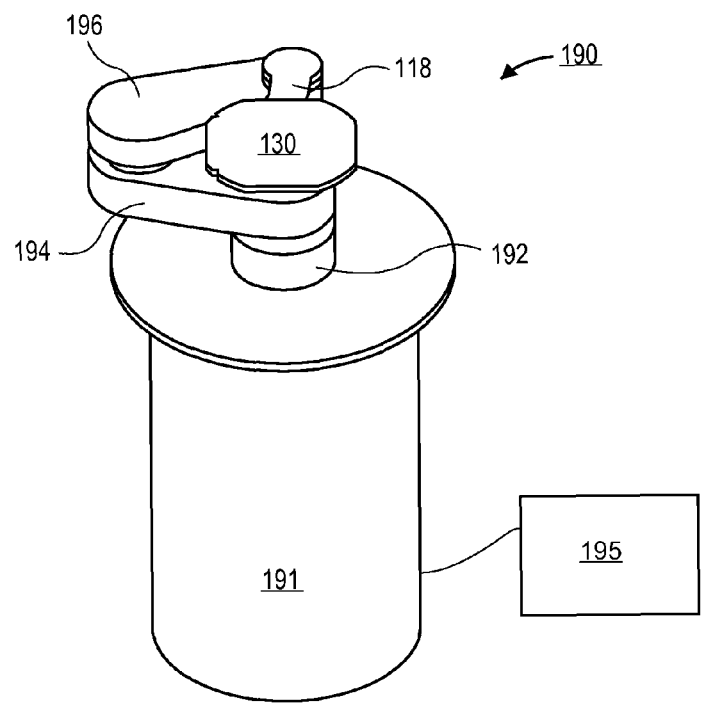
FIG. 1B illustrates a view of a wafer handling robot that may be used in accordance with an embodiment of the invention.

According to embodiments of the invention, a carrier ring assembly 130 is transported by a wafer handling robot. A wafer handling robot 190 according to an embodiment of the invention is illustrated in FIG. 1B. In an embodiment, the wafer handling robot 190 includes a robot drive 191. A robot shaft 192 may extend out of a top surface of the robot drive 191 in order to enable the robot to raise or lower the level of an end effector 118. In an embodiment, the robot shaft 192 is driven by a piston or a lead screw. According to an embodiment, the robot arm may be a selective compliance articulated robot arm (SCARA). For example, a first arm 194 is rotatably coupled to the robot shaft 192. A second arm 196 may be rotatably coupled to the free end of the first arm 194. The end effector 118 may be rotatably coupled to the free end of the second arm 196. The end effector 118 supports a carrier ring assembly 130. According to an embodiment, the wafer handling robot 190 includes one or more encoders for recording the position of the end effector. In an embodiment, the movement of the end effector 118 is controlled by a controller 195. According to an embodiment, the controller 195 is integrated as part of the robot 190. Additional embodiments include a controller that is a distinct machine that is communicatively coupled to the robot 190. For example, the controller may be a component of a processing tool in which the robot 190 is located.

Embodiments of the invention determine the position of the carrier ring assembly 130 with respect to an end effector 118. For example, local center finding techniques are used to determine the center point 140 of the carrier ring 132. When the location of the center point 140 of the carrier ring is known, the controller 195 can direct the end effector 118 to move an amount equal and opposite to the offset between a reference point on the end effector and the center point of the carrier ring. Accordingly, even when the carrier ring is not centered on the end effector, the end effector is able to accurately position the carrier ring when it is placed at a second location, or when the carrier ring needs to fit through a narrow slot.

Figure 2A:
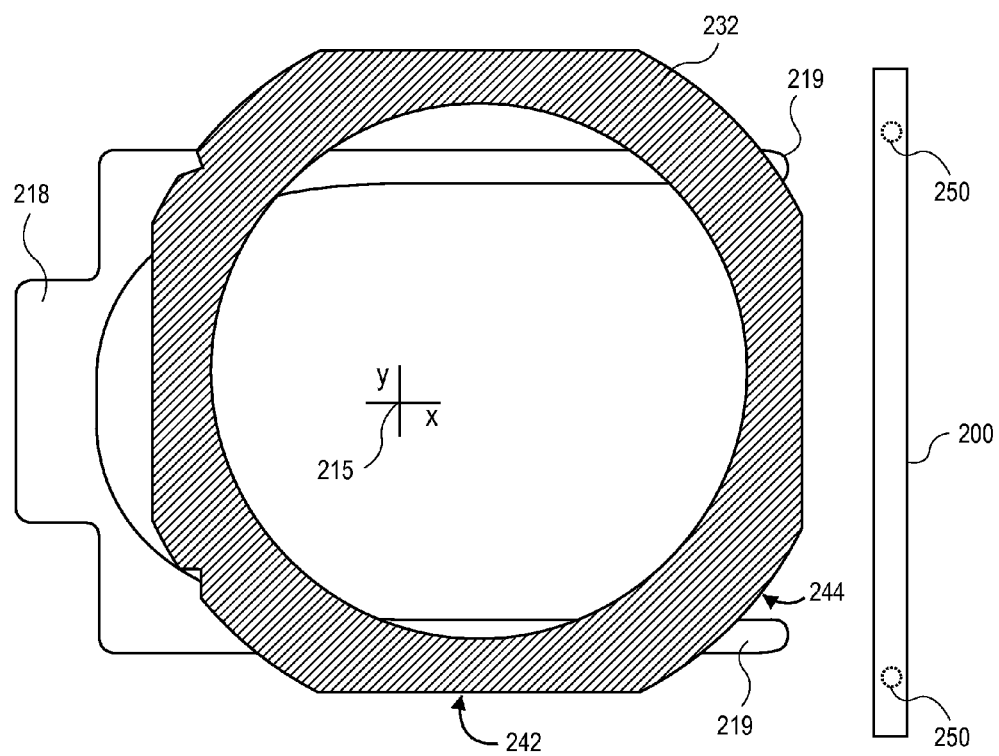
FIG. 2A illustrates a schematic view of a carrier ring supported by an end effector as it passes through a position detection system, according to an embodiment of the invention.

FIG. 2A shows an overhead view of a carrier ring 232 supported by an end effector 218 in accordance with an embodiment of the invention. As illustrated, the backing tape and the substrate are omitted for clarity, but those skilled in the art will recognize that embodiments of the invention are also applicable to the transportation of carrier ring assemblies 130 that include a backing tape layer 134 and a substrate 122. The carrier ring 232 is supported by prongs 219 of the end effector 218. In an embodiment, the end effector is formed from a single component, though embodiments are not so limited. In an embodiment, the end effector 218 has a length that is greater than the width $W_F$ of the carrier ring 232. According to an additional embodiment, the end effector may not extend completely across the width of the carrier ring 232. By way of example, the end effector 218 may be a metallic, ceramic, or composite material. For example, the end effector 218 may be made from aluminum, alumina, or carbon fiber.

A reference point 215 is located at the origin of an X-Y axis. By way of example, the reference point may be at the center point of the end effector 218. According to an embodiment of the invention, no adjustment to the position of the end effector 218 in the X or Y-directions is necessary when the center point of the carrier ring 232 is coincident with the reference point 215. The wafer handling robot 190 utilizes information form the one or more encoders in the robot 190 to determine the position of the reference point 215. For example, encoders may provide the angular orientation of each arm of the robot 190, and the controller 195 utilizes the encoder information to calculate the actual position of the reference point 215.

Figure 2B:
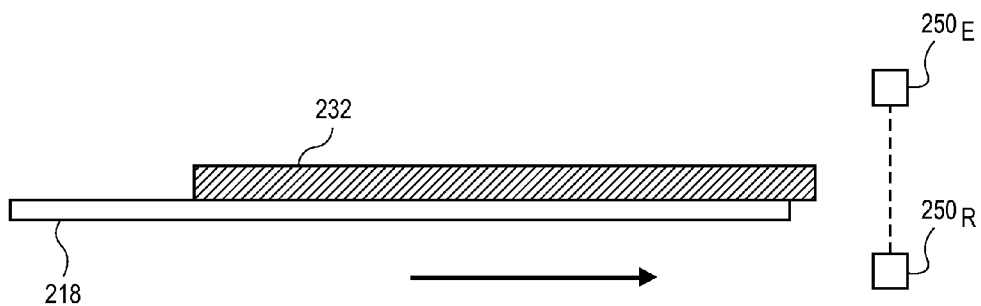
FIG. 2B illustrates a cross-sectional view of the carrier ring supported by an end effector as it passes through a position detection system, according to an embodiment of the invention.

In an embodiment, a position detection system 200 includes a plurality of sensors 250. By way of example, the sensors 250 may be through beam sensors. As illustrated in the cross-sectional view of the position detection system 200 in FIG. 2B, the through beam sensors include an emitter $250_E$ and a receiver $250_R$. The emitter $250_E$ emits a beam of electromagnetic radiation, and the receiver $250_R$ detects the presence of the electromagnetic radiation. As shown in FIG. 2B, the emitter $250_E$ is positioned above the receiver $250_R$, but embodiments are not limited to such configurations. For example, the receiver $250_R$ may be positioned above the emitter $250_E$. The through beam sensor 250 is capable of signaling two distinct states. The first state indicates that the through beam sensor 250 is not blocked (i.e., the receiver $250_R$ is able to detect the electromagnetic radiation because there is no object between the receiver $250_R$ and the emitter $250_E$). The second state indicates that the through beam sensor 250 is blocked (i.e., the receiver $250_R$ does not detect the electromagnetic radiation because there is an object interrupting the path between the receiver $250_R$ and the emitter $250_E$). As used herein, a sensor transition occurs when the sensor 250 switches from a blocked state to an unblocked state, or when the sensor 250 switches from an unblocked state to a blocked state. According to embodiments of the invention, the plurality of sensors 250 are formed in a substantially linear arrangement, though embodiments are not limited to such configurations. In an embodiment, the position detection system 200 is communicatively coupled to controller 195. As such, when a sensor transition occurs, the controller 195 is informed that it needs to record the position of the reference point 215.

In an embodiment such as the one depicted in FIG. 2A, sensor transitions along the curved edges 244 of the carrier ring 232 are used to detect the center point of the carrier ring 232. In order to prevent the end effector from causing transitions or from preventing transitions, the controller 195 directs the motion of the end effector 218 such that the end effector 218 will not pass through the sensors 250. For example, FIG. 2A illustrates the sensors 250 passing outside the prongs 219 of the end effector 218, but embodiments are not limited to such configurations. Additional embodiments include sensors 250 that pass within the prongs 219 of the end effector. Additional embodiments include one or more sensors 250 passing inside the prongs 219 of the end effector 218 while one or more sensors 250 pass outside the prongs 219 of the end effector 218. As indicated by the arrow in FIG. 2A, the end effector 218 advances the carrier ring 232 in the X-direction towards the position detection system 200. As the carrier ring 232 passes between the emitter $250_E$ and the receiver $250_R$ a plurality of sensor transitions are registered by the position detection system 200. At each sensor transition, the controller 195 records the position of the reference point 215.

Figure 2C:
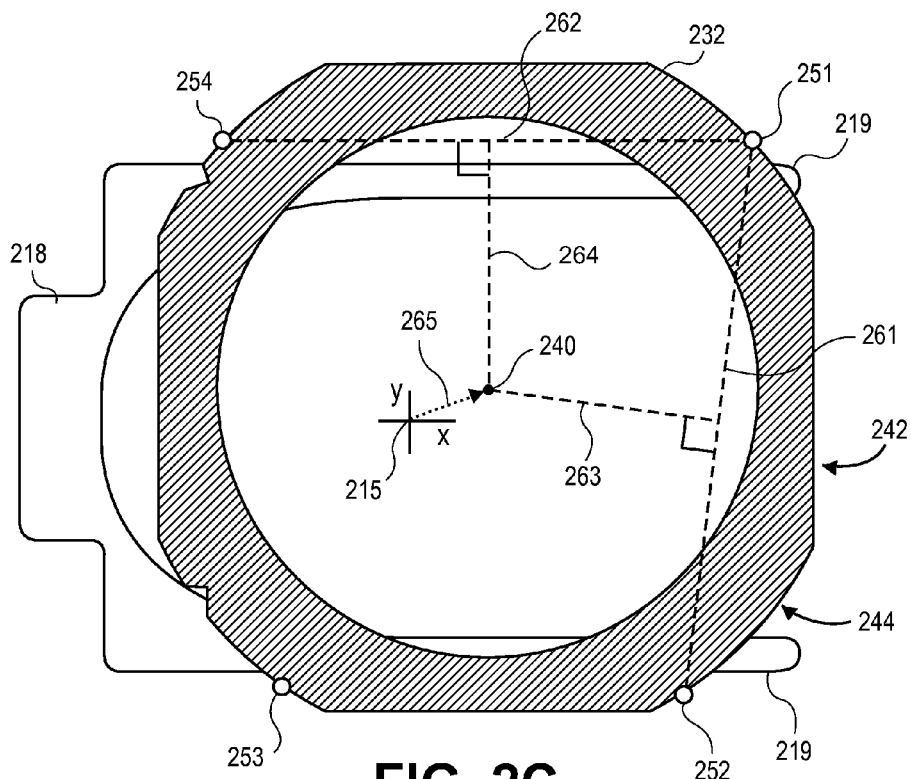
FIG. 2C illustrates a schematic view of a carrier ring and the position of sensor transitions on the carrier ring, according to an embodiment of the invention.

Referring to FIG. 2C, the reference point 215 is set to be the origin of an X-Y coordinate system. Since the location of each sensor 250 is known and the position of the end effector 218 at each sensor transition 251-254 is recorded by the controller 195, the location of each sensor transitions 251-254 can be plotted on the X-Y coordinate system defined by the reference point 215. To improve understanding of the following description, the end effector 218 and the carrier ring 232 are superimposed over X-Y coordinate system.

According to an embodiment, one or more local center finding algorithms or techniques may use the locations of sensor transitions 251-254 to find the center point 240 of the carrier ring 232. For example, one such local center finding technique only requires three sensor transitions to define the center point 240 of the carrier ring 232. In such an embodiment, a first chord 261 is formed between a first sensor transition 251 and a second sensor transition 252. A second chord 262 is formed between two sensor transitions as well. For example, the second chord 262 is formed between transitions 251 and 254. Next the intersection point of the perpendicular bisectors 263 and 264 of the first and second chords provide the center point 240 of the carrier ring 232. According to additional embodiments, the center point 240 may be an average center point of multiple pairs of perpendicular bisectors. The accuracy of the center point 240 may be further increased by detecting erroneous transitions. For example, if a transition were determined to not have occurred along a curved edge 244 (e.g., along a flat edge 242, a notch, or the end effector 218) then that transition may be omitted from calculations of the center point 240. In an embodiment, the remaining valid sensor transitions are utilized to determine the center point 240. Once the center point 240 has been determined, the controller 195 adjusts the position of the end effector 218 by an amount equal and opposite to the offset 265. The adjustment to correct the offset 265 allows the carrier ring 232 to be accurately centered when placed at a second location.

Figure 3A:
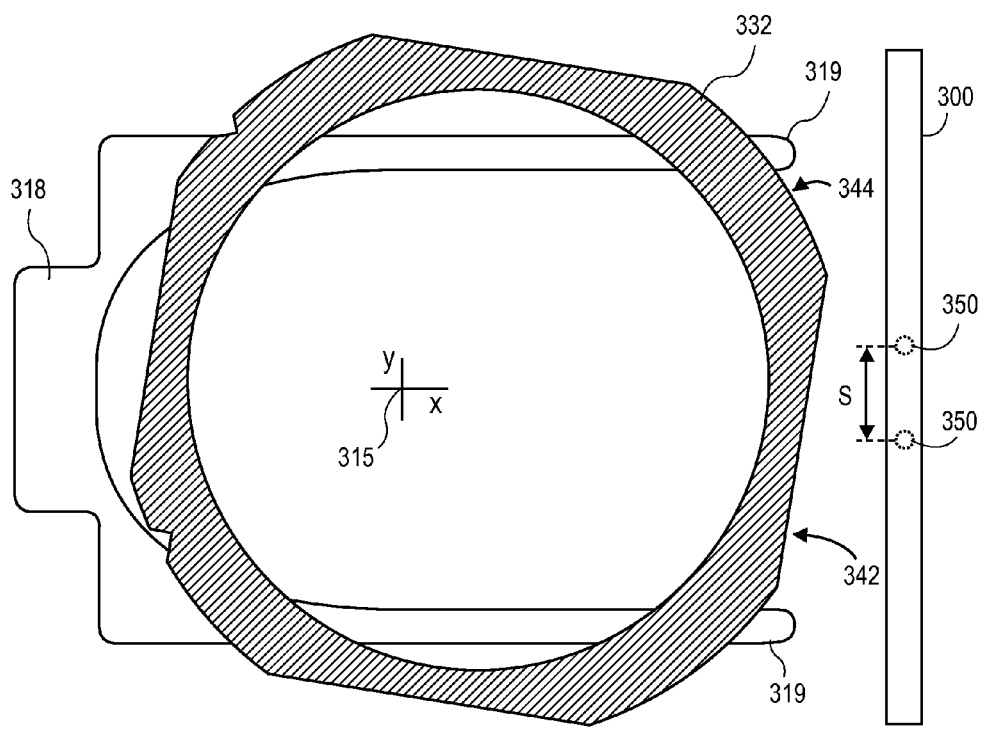
FIG. 3A illustrates a schematic view of a carrier ring supported by an end effector as it passes through a position detection system, according to an embodiment of the invention.
Figure 3B:
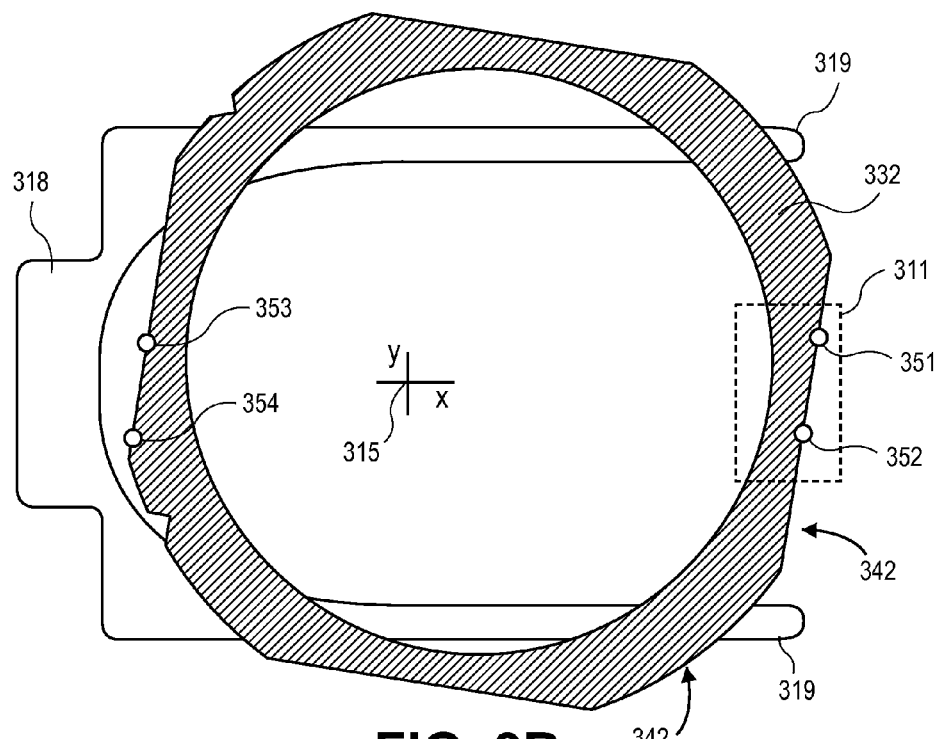
FIG. 3B illustrates a schematic view of a carrier ring and the position of sensor transitions on the carrier ring, according to an embodiment of the invention.
Figure 3C:
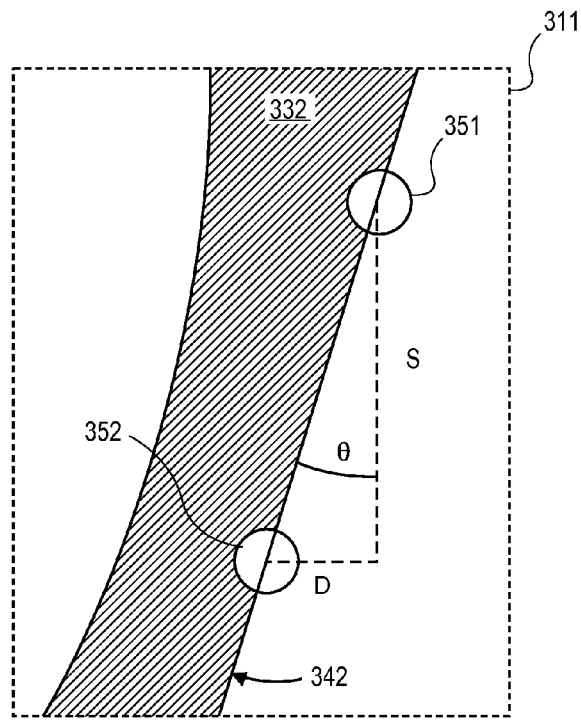
FIG. 3C illustrates a zoomed in portion of FIG. 3B, according to an embodiment of the invention.

According to an additional embodiment illustrated in FIGS. 3A-3C, the degree of rotation about the reference point 315 is determined by tracking sensor transitions along flat edges 342 of the carrier ring. As noted above, carrier rings 232 do not have a uniform diameter due to the presence of curved and flat edges. As such, when the rotation of the carrier ring is not aligned properly the carrier ring 332 may not fit through an opening.

Referring to FIG. 3A, a carrier ring 332 is supported by an end effector 318. According to an embodiment, the end effector 318 is substantially similar to the end effector 218 described with respect to FIGS. 2A-2C. According to an embodiment, position detection system 300 includes a plurality of through beam sensors 350 that will pass over flat edges 342 of the carrier ring 332. For example, two sensors 350 are spaced apart a distance S from each other. By way of example, the sensors 350 may be spaced apart a distance S of approximately 25 mm. In additional embodiments, the distance S may be substantially the same as the length of a flat edge 342. By way of example, the distance S may be between 10 mm and 180 mm. As indicated by the arrow, the end effector 318 advances the carrier ring in the X-direction through the sensors 350.

As shown in FIG. 3B, the reference point 315 is set to be the origin of an X-Y coordinate system. Since the location of each sensor 350 is known and the position of the end effector 318 at each sensor transition 351-354 is recorded by the controller 195, the location of each sensor transitions 351-358 can be plotted on the X-Y coordinate system defined by the reference point 315. To improve understanding of the following description, the end effector 318 and the carrier ring are superimposed over X-Y coordinate system.

According to an embodiment, sensor transitions 351-354 occur along flat edges 342 of the carrier ring 332. Accordingly, the angular rotation θ of the carrier ring 332 may be found by constructing a right triangle with the hypotenuse being the portion of the flat edge 342 positioned between the two sensor transitions, as illustrated in the zoomed in portion 311 in FIG. 3C. A first leg of the triangle represents the distance between the two sensor transitions in the Y-direction. In embodiments in which the path of the end effector 318 intersects the position detection system at a right angle, the vertical distance between the sensor transitions is equal to the distance S between the sensors 350. A second leg of the triangle represents the distance D between the sensor transitions in the X-direction. Accordingly, the length D of the second leg of the triangle is the difference in the X-coordinates between the two sensor transitions. For example, in the zoomed in portion 311, the rotation θ is determined from sensor transitions 351 and 352. The first leg has a length S and the second leg has a length D. The angle or rotation θ about the reference point 315 can be determined according to Equation 1

$$\theta = \tan^{-1}\left(\frac{D}{S}\right) \quad \text{(Equation 1)}$$

Additional embodiments include finding an angle of rotation θ by averaging the angle or rotation calculated between multiple pairs of sensor transitions. For example, the average rotation $\theta_{ave}$ may be obtained by calculating the angle of rotation θ for multiple sensor transition pairs formed along flat edges 342

In an embodiment, the controller 195 adjusts the rotation of the end effector 318 by an amount equal and opposite to the rotation of the carrier ring 332. The adjustment allows the carrier ring to passed through opening with that only have enough clearance to allow the width $W_F$ to pass through.

Figure 4A:
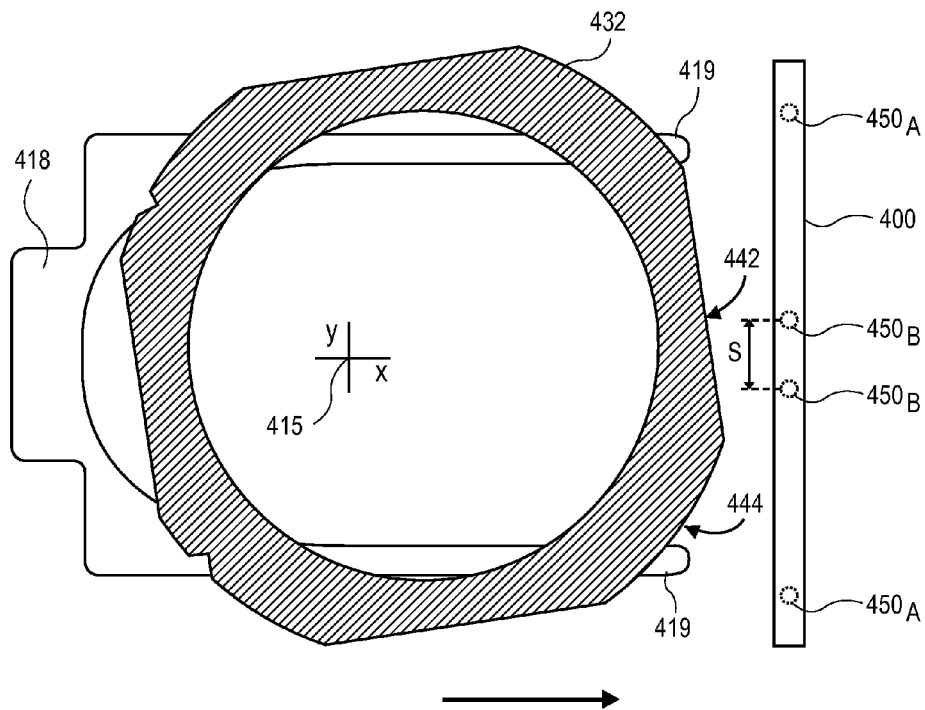
FIG. 4A illustrates a schematic view of a carrier ring supported by an end effector as it passes through a position detection system, according to an embodiment of the invention.

According to an additional embodiment, the offset of the center point of a carrier ring from a reference point on the end effector and the angular rotation of the carrier ring can be determined with a position detection system. For example, a position detection system 400 illustrated in FIG. 4A includes a plurality of sensors 450. In such embodiments, position detection system 400 includes a first pair of sensors $450_A$ that are aligned such that they pass over curved edges 444 of the carrier ring 432. The position detection system 400 may also include a second pair of sensors 450$_B$ that are aligned such that they pass over flat edges 442 of the carrier ring 432. According to an embodiment, the carrier ring 432 is advanced through the position detection system 400 as indicated by the arrow.

Figure 4B:
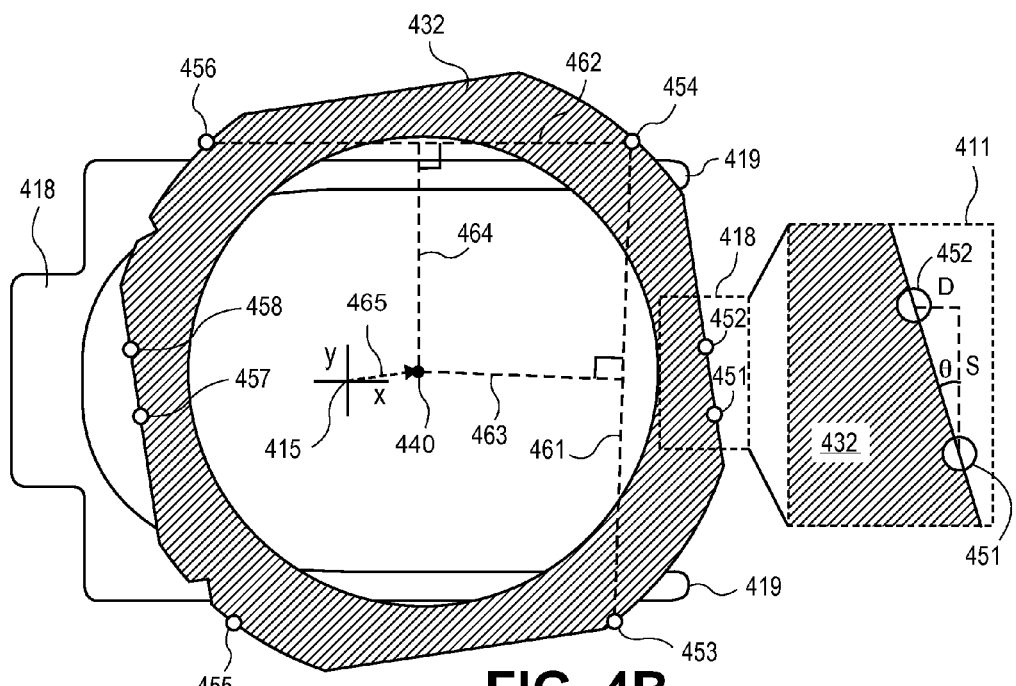
FIG. 4B illustrates a schematic view of a carrier ring and the position of sensor transitions on the carrier ring, according to an embodiment of the invention.

Referring to FIG. 4B, the reference point 415 is set to be the origin of an X-Y coordinate system. Since the location of each sensor 450 is known and the position of the end effector 418 at each sensor transition 451-458 is recorded by the controller 195, the location of each sensor transitions 451-458 can be plotted on the X-Y coordinate system defined by the reference point 415. To improve understanding of the following description, the end effector 418 and the carrier ring are superimposed over X-Y coordinate system.

According to an embodiment, sensor transitions 453-456 occur along curved edges 444 of the carrier ring 432. Accordingly, the center point 440 of the carrier ring may be found with a local center finding process. For example, the intersection of any two perpendicular bisectors of any two chords may be used to locate the center point 440 in substantially the same manner as described above with respect to FIGS. 2A-2C. As illustrated, chord 461 between sensor transitions 453 and 454, and chord 462 between sensor transitions 456 and 454 are used according to an embodiment. The perpendicular bisectors 463 and 464 intersect at the center point 440 of the carrier ring 432. According to additional embodiments, the average center point 440 found by averaging the X and Y-coordinates of multiple calculated center points 440 found that are calculated with different chord pairs and their perpendicular bisectors.

According to an embodiment, sensor transitions 451, 452, 457, and 458 occur along flat edges 442 of the carrier ring 432. Accordingly, the angular rotation θ of the carrier ring 432 may be found in substantially the same manner as described above with respect to FIGS. 3A-3C. For example, in the zoomed in portion 411, the rotation θ is determined from sensor transitions 451 and 452. The first leg has a length S and the second leg has a length D. The angle of rotation θ about the reference point 415 can be determined according to Equation 1 set forth above. Additional embodiments include finding an angle of rotation θ by averaging the angle or rotation calculated between multiple pairs of sensor transitions. For example, the average rotation A θ$_{ave}$ may be obtained by calculating the angle of rotation θ for multiple sensor transition pairs formed along flat edges 442.

According to an additional embodiment, the center point of the substrate supported by the adhesive backing tape may also be found. Finding the center point of the substrate is beneficial because it may not coincide with the center point of the carrier ring. For example, when the substrate is placed on the adhesive backing tape, it may be misaligned. As such, the carrier ring may need to be placed on a chuck with an offset in order to ensure that the substrate is properly centered in a processing tool when the substrate is misaligned.

Figure 5A:
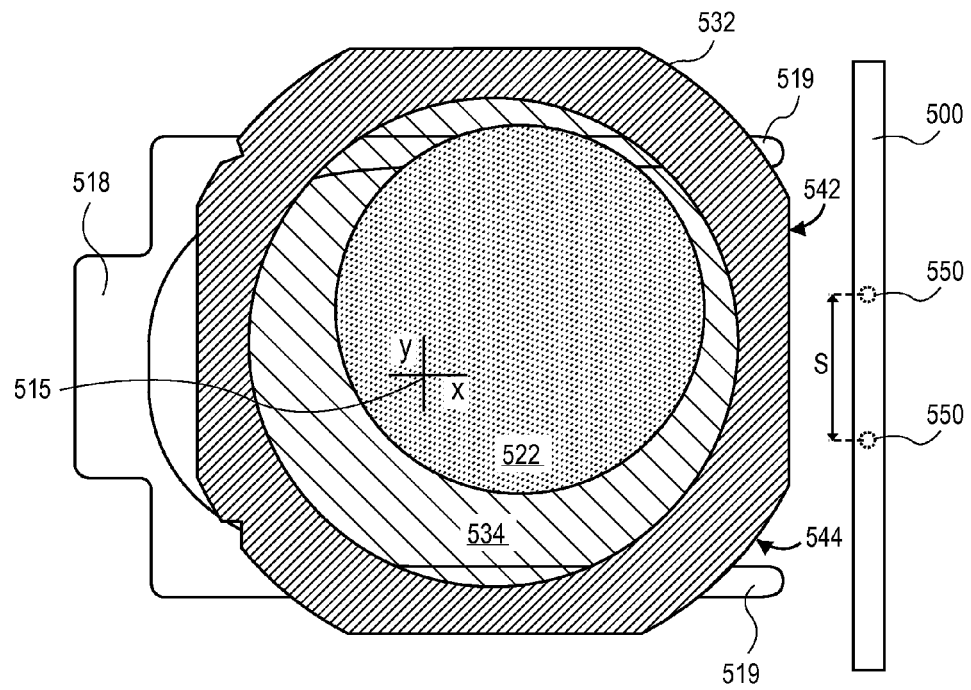
FIG. 5A illustrates a schematic view of a carrier ring assembly supported by an end effector as it passes through a position detection system, according to an embodiment of the invention.

Referring now to FIG. 5A, a substrate 522 is supported by a carrier ring 532 and backing tape 534. According to an embodiment, the backing tape is transparent or partially transparent. For example, the backing tape 534 may include transparent polyolefin or transparent poly(vinyl chloride) (PVC). In such embodiments, sensor transitions are capable of occurring along the circumference of the substrate 522. In FIG. 5A, the end effector 518 advances a carrier ring 532 in the X-direction through a position detection system 500. According to an embodiment, the position detection system 500 includes sensors 550 that will cross the substrate 522 as the carrier ring is passed through the position detection system 500.

Figure 5B:
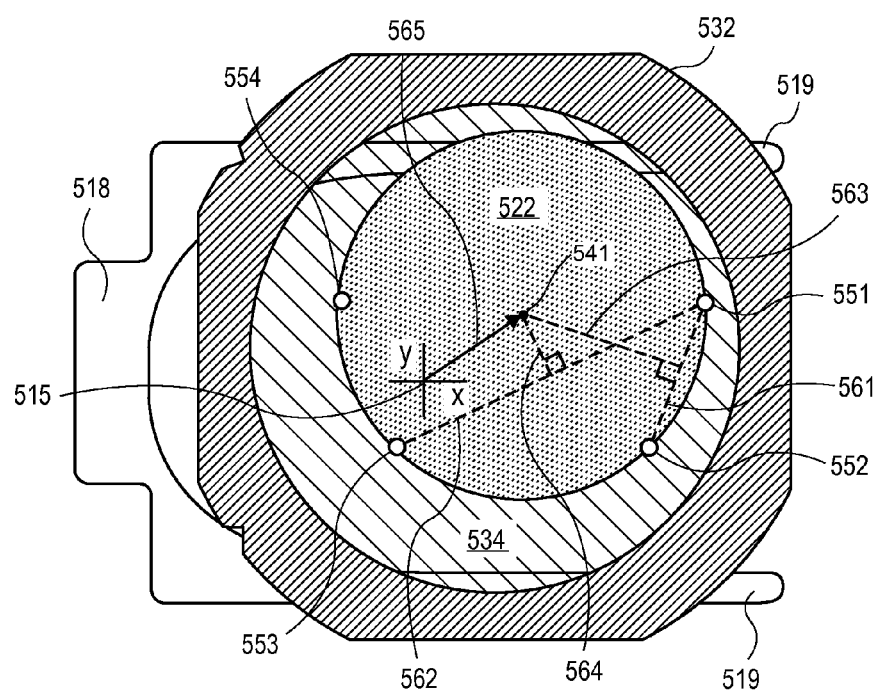
FIG. 5B illustrates a schematic view of a carrier ring assembly and the position of sensor transitions on the carrier ring assembly, according to an embodiment of the invention.

Referring now to FIG. 5B, the reference point 515 of the end effector 518 is set to be the origin of an X-Y coordinate system. Since the location of each sensor 550 is known and the position of the end effector 518 at each sensor transition 551-554 is recorded by the controller 195, the location of each sensor transitions 551-554 can be plotted on the X-Y coordinate system defined by the reference point 515. To improve understanding of the following description, the end effector 518, the carrier ring 532, and the substrate 522 are superimposed over X-Y coordinate system.

According to an embodiment, sensor transitions 551-554 occur along the circumference of the substrate 522. Accordingly, the center point 541 of the substrate may be found with a local center finding process. For example, the intersection of any two perpendicular bisectors of any two chords may be used to locate the center point 541. As illustrated, the chord 561 between sensor transitions 551 and 552, and chord 562 between sensor transitions 551 and 553 are used according to an embodiment. The perpendicular bisectors 563 and 564 intersect at the center point 541 of the substrate 522. According to additional embodiments, the average center point 541 is found by averaging the X and Y-coordinates of calculated center points 541 that are found with multiple pairs of chords between various sensor transitions. Once the center point 541 of the substrate 522 has been identified, the controller 195 can instruct the end effector 518 to adjust its location by an amount equal and opposite to the offset 565 in order to ensure that the substrate 522 is properly centered when placed at a second location.

Figure 5C:
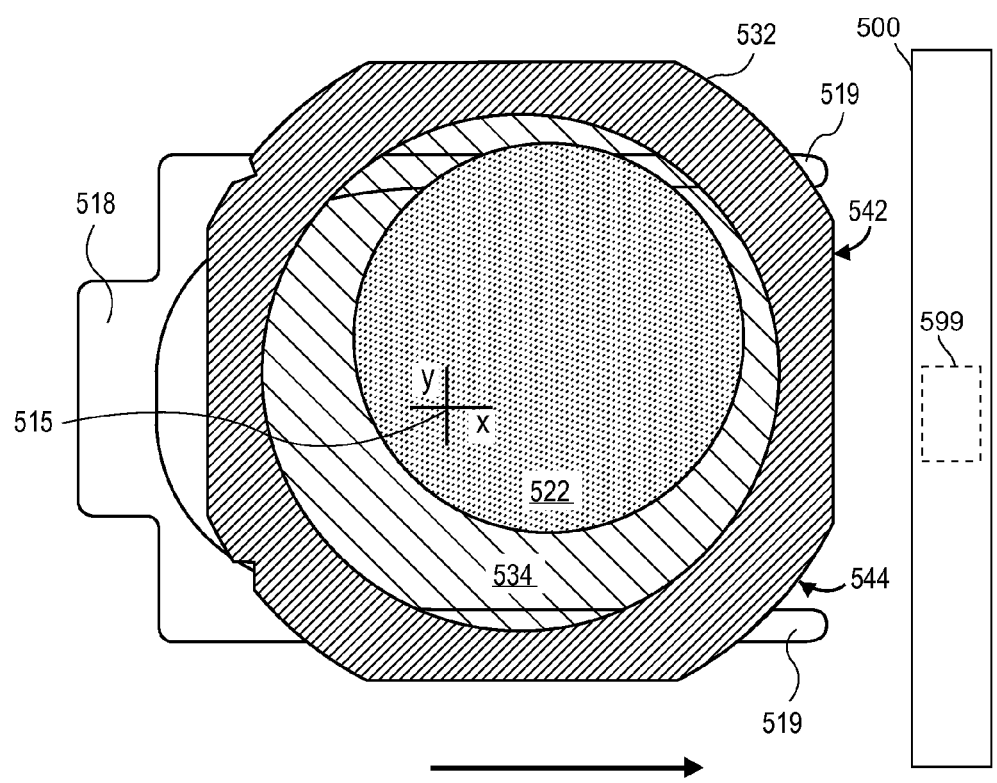
FIG. 5C illustrates a schematic view of a carrier ring assembly supported by an end effector as it passes through a position detection system, according to an embodiment of the invention.

Referring now to FIG. 5C, the center point 541 of the substrate 522 may be found with a position detection system 500 according to an additional embodiment. As shown, FIG. 5C is substantially similar to FIG. 5A, with the exception of the position detection system 500. According to an embodiment, the position detection system 500 utilizes a camera 599. By way of example, the camera 599 has a field of vision that encompasses the entire carrier ring assembly 530. As the end effector 518 passes below the position detection system 500, the camera 599 takes an image of the carrier ring 532. According to an embodiment, software associated with the camera 599 processes the image and determines the center point of the substrate 522 with respect to the end effector 518. According to an embodiment, a position detection system 500 may utilize a camera 599 and one or more through beam sensors 550.

In an embodiment, a position detection system 500 that utilizes a camera 599, may be used in combination with one or more additional position detection systems that utilize through beam lasers, such as those described herein. In such embodiments, a position detection system 500 with a camera 599 may take an initial image of the carrier ring assembly. From this image, software associated with the camera may determine the center point of the substrate 522 relative to the center point of the carrier ring 532. Since the substrate 522 is secured to the carrier ring 532 with an adhesive backing tape 534, the substrate 522 will not move relative to the carrier ring 532 during transfers between locations, or during subsequent processing. As such, once an image of the carrier ring assembly has been acquired by the camera 599, the position of the substrate 522 with respect to the carrier ring 532 does not need to be found again.

For example, the position of the center point of the substrate 522 relative to the center point of the carrier ring 532 may be determined with a camera 599 prior to placing the carrier ring assembly into a cassette or FOUP. Additional embodiments include obtaining the image before, after, or during any process, or at any location. For example, the image may be obtained immediately after the substrate 522 is placed on the adhesive backing tape 534, which may occur in a separate tool. After the image of the substrate 522 and carrier ring 532 is obtained, when the carrier ring assembly is transferred by an end effector 518 from a first location to a second location, such as a chuck in a processing chamber, a position detection system will only need to determine the position of the carrier ring assembly 532 relative to the end effector reference point 515. For example, the offset between may be determined with a position detection system, such as position detection system 400 described above. In such an embodiment, the combination of the offsets provided by the image obtained by the camera 599 and the offset of the carrier ring assembly provided by position detection system 400, will allow the controller 195 to instruct the end effector 518 to adjust its location by an amount equal and opposite to the combined offsets in order to ensure that the substrate 522 is properly centered when placed at the second location.

Embodiments that utilize position detection systems that include a camera and sensors, allows for the center point of the substrate 522 to be properly aligned at a second location, even when the sensors of a position detection system cannot pass through the adhesive backing tape 534. Accordingly, embodiments of the invention allow for accurate positioning of a substrate 522 supported by a carrier ring 532 even when the carrier ring assembly utilizes adhesive backing tape 534 that is not transparent.

Figure 6A:
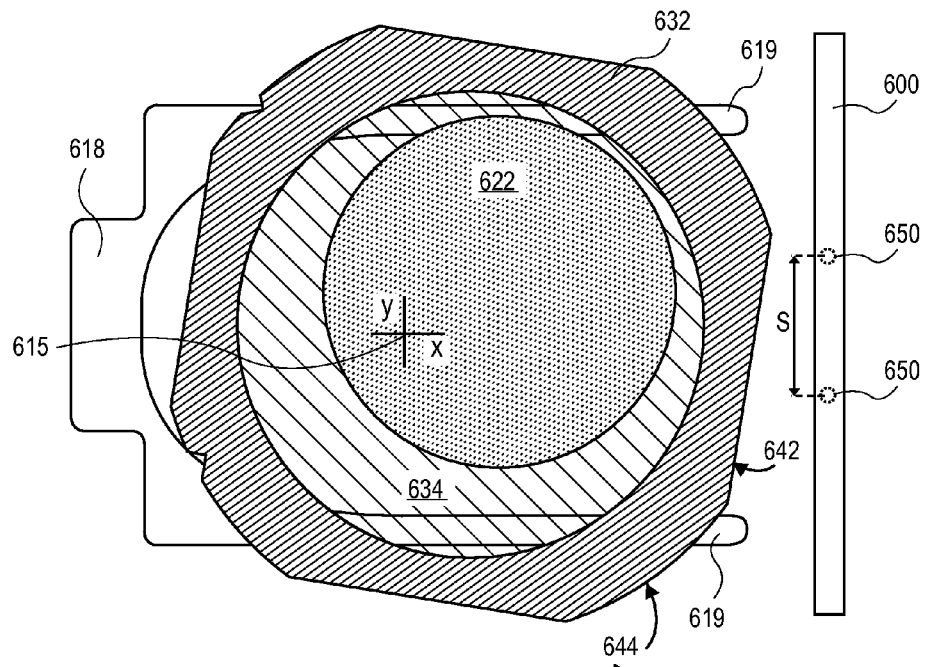
FIG. 6A illustrates a schematic view of a carrier ring assembly supported by an end effector as it passes through a position detection system, according to an embodiment of the invention.

Additionally, embodiments of the invention include finding the center point of the substrate and the rotation of the carrier ring with respect to the reference point of the carrier ring. According to an embodiment, a position detection system 600 with two sensors 650 is able to provide both the center point of a substrate 622 and the rotation of the carrier ring 632. As illustrated in FIG. 6A, the carrier ring 632 and the substrate are advanced in the X-direction through the position detection system 600. In an embodiment, the position detection system 600 includes two sensors 650 that are spaced apart from each other by a distance S. The sensors 650 are positioned such that they will pass over the flat edges 642 of the carrier ring 632 and over points along the circumference of the substrate 622.

Figure 6B:
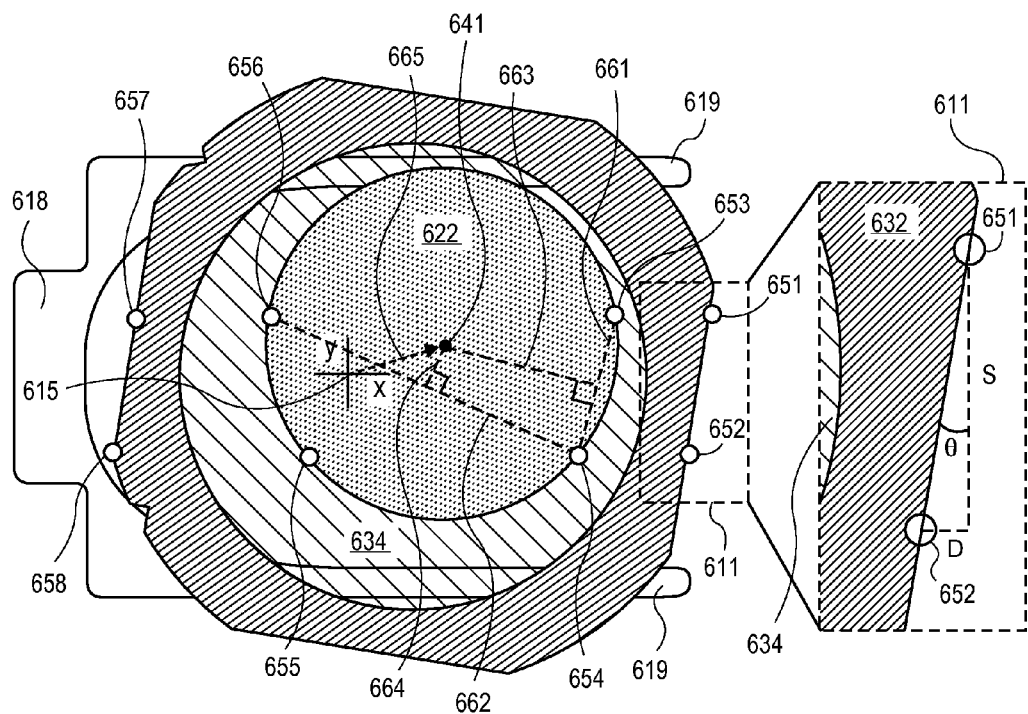
FIG. 6B illustrates a schematic view of a carrier ring assembly and the position of sensor transitions on the carrier ring assembly, according to an embodiment of the invention.

The positions of the sensor transitions 651-658 are illustrated with respect to the reference point 615 of the carrier ring in FIG. 6B. Sensor transitions 653-656 occur along the circumference of the substrate 622. As such, local center finding techniques, such as similar techniques to those described above, may be used to determine the center point 641 of the substrate. For example, the intersection of perpendicular bisectors 663 and 664 of chords 661 and 662 intersect at the center point 641. Additional embodiments include averaging multiple center points that were calculated by various center finding techniques. According to an embodiment, the controller 195 instructs the end effector 618 to adjust it position by an amount equal and opposite to the offset 665 in order to accurately center the substrate 622 when placed at a second location.

Sensor transitions 661, 662, 657, and 658 are formed along flat edges 642 of the carrier ring. Accordingly, these sensor transitions are capable of determining the angular rotation θ of the carrier ring 632 with respect to the reference point 615. As illustrated in the zoomed in region 611, a right triangle is constructed by using the portion of the flat edge between sensor transitions 651 and 652 as the hypotenuse. The distance between the sensors S is used as a first leg of the triangle, and the difference in the X-coordinates between sensor transitions 651 and 652 are used as the second leg D. According to an embodiment, these values are used in conjunction with Equation 1 above to determine the angle of rotation θ. According to additional embodiments, the angle of rotation θ may be calculated multiple times with various sensor transitions that occurred along flat edges 642 of the carrier ring 632 in order to produce an average angle of rotation $\theta_{ave}$. In an embodiment, the end effector 618 may then be rotated in an amount opposite to the angle of rotation θ in order to properly orient the carrier ring 632. For example, it may be beneficial to orient the carrier ring 632 such that the width $W_F$ is oriented to an opening or slot in order to fit through.

Figure 7A:
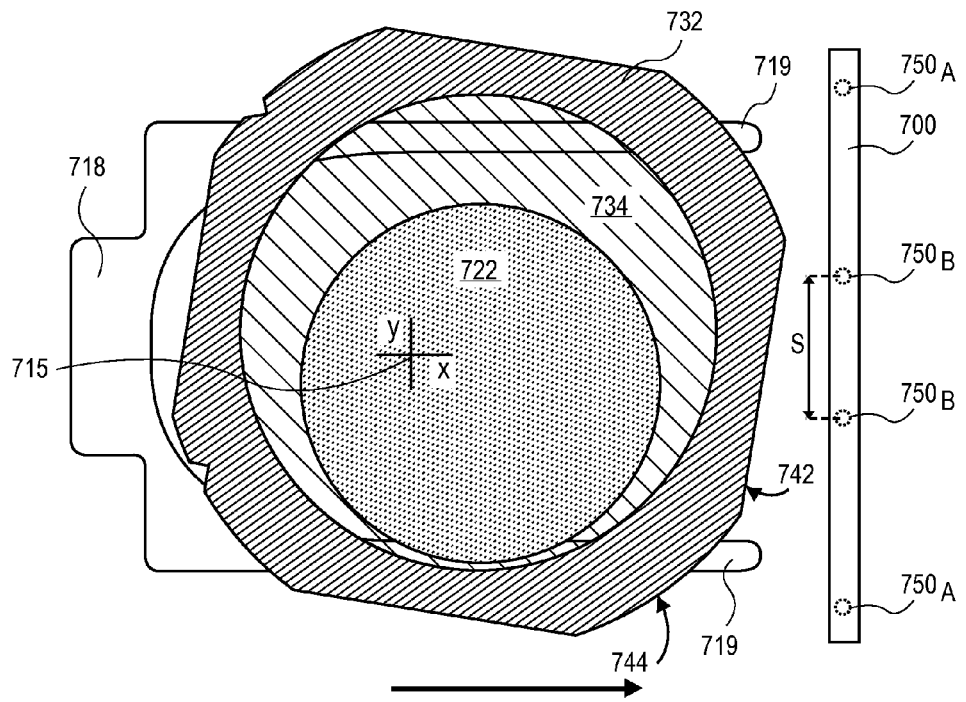
FIG. 7A illustrates a schematic view of a carrier ring assembly supported by an end effector as it passes through a position detection system, according to an embodiment of the invention.
Figure 7B:
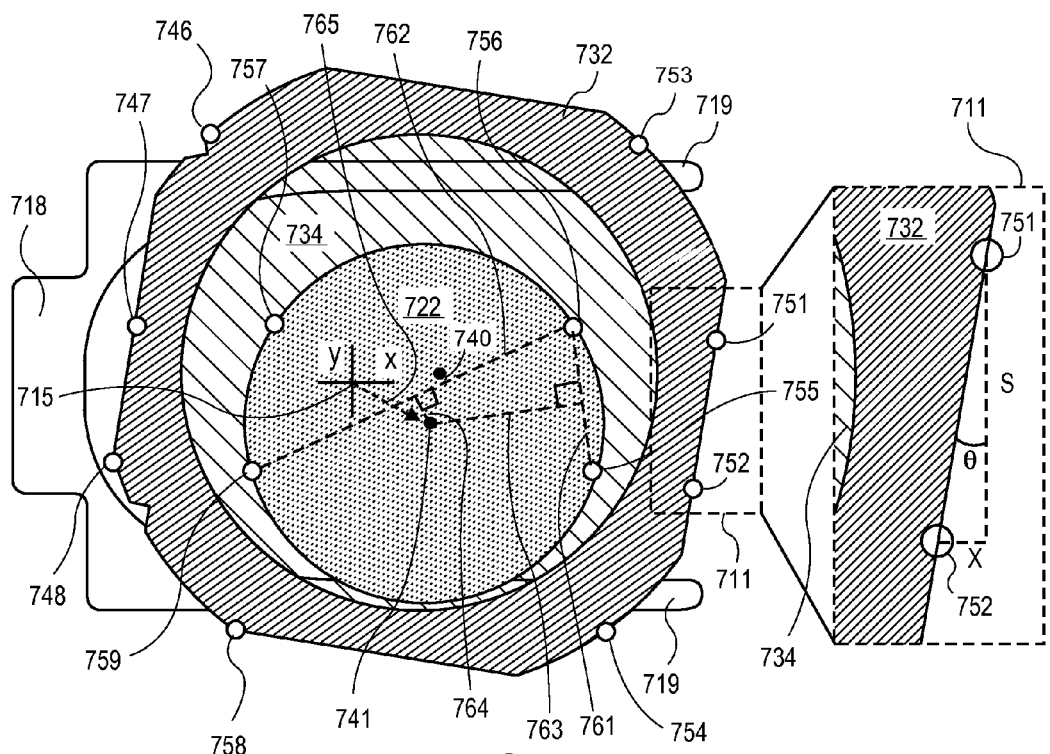
FIG. 7B illustrates a schematic view of a carrier ring assembly and the position of sensor transitions on the carrier ring assembly, according to an embodiment of the invention.

In an additional embodiment of the invention, a position detection system may be used to determine the center point of the carrier ring, the center point of the substrate, and the angular rotation of the carrier ring. Such an embodiment is illustrated in FIGS. 7A and 7B. All three positions may be needed during the transfer of the carrier ring 732 from a first location to a second location. For example, the center point 740 and angular rotation θ of the carrier ring 732 may be needed in order to pass the carrier ring through a narrow opening, such as a load lock opening or a FOUP opening. Thereafter, the center point of the substrate 722 may be needed in order to ensure that the substrate 722 is properly aligned over the center of a second position. By way of example, if the second position is a chuck in a processing tool, then accurate alignment of the center point of the substrate 722 with the center of the chuck will provide improved processing conditions.

As illustrated in FIG. 7A, a position detection system 700 may include four or more sensors 750. A first pair of sensors $750_A$ may be positioned such that they cross over the curved edges 744 of the carrier ring 732 when the carrier ring passes through the position detection system 700. In an embodiment, the first pair of sensors $750_A$ are used to determine the center point 740 of the carrier ring 732. A second pair of sensors $750_B$ may be positioned such that they cross over the flat edges 742 of the carrier ring 732 and over the circumference of the substrate 722 as the carrier ring passes through the position detection system 700. In an embodiment, the second pair of sensors $750_8$ are used to determine the center point of the substrate 722, and the angle of rotation θ of the carrier ring 732.

As illustrated in FIG. 7B, the position of the sensor transitions 746-748 and 751-759 are plotted in relation to the reference point 715 of the end effector 718. According to an embodiment, reference points 746, 753, 754, and 758 occur along curved edges 744 of the carrier ring 732. Accordingly, center finding techniques, such as those substantially similar to those described above may be used to determine the center point 740 of the carrier ring 732. For example, perpendicular bisectors of two chords may be used to determine the center point of the carrier ring. For purposes of clarity, the chords of the carrier ring 732 and their perpendicular bisectors are not illustrated.

According to an embodiment, sensor transitions 747, 748, 751, and 752 occur along flat edges 742 of the carrier ring 732. As shown in the zoomed in portion 711, a right triangle substantially similar to those described above may be constructed along the flat edge 742 between the locations of the sensor transitions. Using the distance S between the second pair of sensors $750_B$ and the difference between the X-coordinates of the two sensor transitions 751 and 752, the angle of rotation θ of the carrier ring may be determined with Equation 1.

According to an embodiment, sensor transitions 755-757 and 759 occur along the circumference of the substrate 722. Accordingly, center finding techniques, such as those substantially similar to those described above may be used to determine the center point 741 of the substrate 722. For example, perpendicular bisectors 763 and 764 of two chords 761 and 762 may be used to determine the center point 741 of the substrate 722. In an embodiment, the offset 765 between the reference point 715 and the center point 741 of the substrate may be used by the controller 195 to determine a position correction amount in order to properly center the substrate 722 when it is placed at a second location.

Figure 8A:
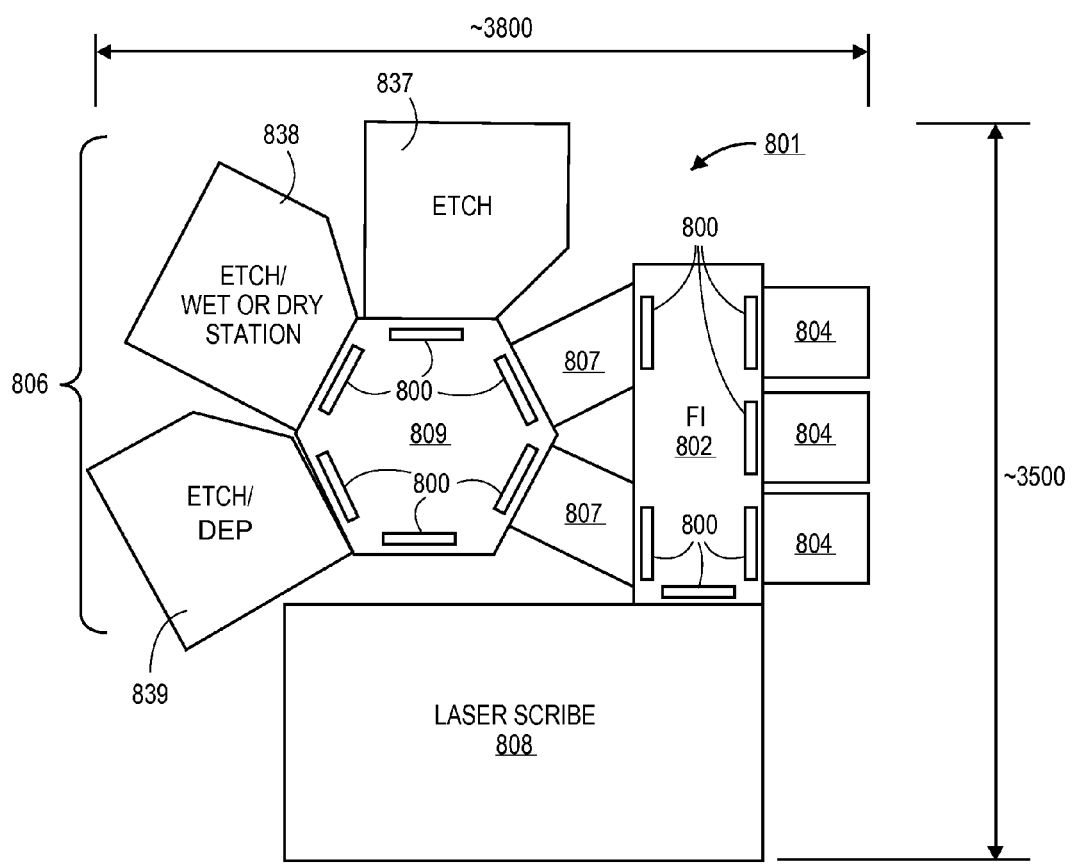
FIG. 8A is an illustration of a block diagram of a processing tool, according to an embodiment of the invention.

Referring now to FIG. 8A, a process tool 801 that includes one or more load ports 804 and a factory interface 802 is shown according to an embodiment. The process tool 801 may include a cluster tool 806 that is coupled to the factory interface 802 by load locks 807. The cluster tool includes a transfer chamber 809 in which a robot, such as a robot 190 described herein transfers carrier ring assemblies from the load locks 807 to a process tool in a vacuum environment. In an embodiment, the cluster tool 806 also includes one or more plasma etch chambers 837. In an embodiment, the process tool 801 includes a laser scribe apparatus 808. A process tool 801 may be configured to perform a hybrid laser and etch singulation process of individual device dies formed on a substrate 122, such as a silicon wafer that is supported by a carrier ring 132.

In an embodiment, the laser scribe apparatus 808 houses a femtosecond-based laser. The femtosecond-based laser may be suitable for performing a laser ablation portion of a hybrid laser and etch singulation process of individual device dies formed on a substrate 122, such as a silicon wafer that is supported by a carrier ring 132. In one embodiment, a moveable stage is also included in the laser scribe apparatus 808, the moveable stage configured for moving a substrate 122 supported by a carrier ring 132 relative to the femtosecond-based laser. In another embodiment, the femtosecond-based laser is also moveable.

In an embodiment, the one or more plasma etch chambers 837 in the cluster tool 806 may be suitable for performing an etching portion of a hybrid laser and etch singulation process of individual device dies formed on a substrate 122, such as a silicon wafer that is supported by a carrier ring 132. An etch chamber may be configured for etching a substrate 122 supported by a carrier ring 132 through the gaps in a patterned mask. In one such embodiment, the one or more plasma etch chambers 837 in the cluster tool 806 is configured to perform a deep silicon etch process. In a specific embodiment, the one or more plasma etch chambers is an Applied Centura® Silvia™ Etch system, available from Applied Materials of Sunnyvale, Calif., USA. The etch chamber may be specifically designed for a deep silicon etch used to singulated integrated circuits housed on or in single crystalline silicon substrates or wafers. In an embodiment, a high-density plasma source is included in the plasma etch chamber to facilitate high silicon etch rates.

In an embodiment, the factory interface 802 may be a suitable atmospheric port to interface with the load ports 804, with the laser scribe tool 808, and with the load locks 807. The factory interface 802 may include one or more robots 190 with arms and one or more end effectors 118 for transferring carrier ring assemblies 130 from FOUPs docked at the load ports 804 into either cluster tool 806 or laser scribe apparatus 808, or both.

Cluster tool 806 may include other chambers suitable for performing functions in a method of singulation. For example, in one embodiment, in place of an additional etch chamber, a deposition chamber 839 is included. The deposition chamber 839 may be configured for mask deposition on or above a device layer of a wafer or a substrate prior to laser scribing of the wafer or substrate. In one such embodiment, the deposition chamber 839 is suitable for depositing a water soluble mask. In another embodiment, in place of an additional etch chamber, a wet/dry 838 station is included. The wet/dry station 838 may be suitable for cleaning residues and fragments, or for removing a water soluble mask, subsequent to a laser scribe and plasma etch singulation process of a substrate or a wafer. In an embodiment, a metrology station is also included as a component of process tool 801.

According to embodiments of the invention, one or more position detection systems 800 may be located throughout the process tool 801. According to an embodiment, position detection systems 800 may be located at any of the junctions between components included in the process tool 801. For example, a position detection system 800 may be located proximate to the junction between the one or more of the load ports 804 and the factory interface 802, proximate to the junction between the factory interface 802 and one or more of the load locks 807, proximate to the junction between the factory interface 802 and the laser scribe 808, proximate to the junction between one or more of the load locks 807 and the transfer chamber 809, proximate to the junction between one or more of the processing chambers 837 and the transfer chamber 809, or any combination thereof. Additional embodiments include a position detection system 800 positioned in any location accessible to a robot of the process tool 801.

Figure 8B:
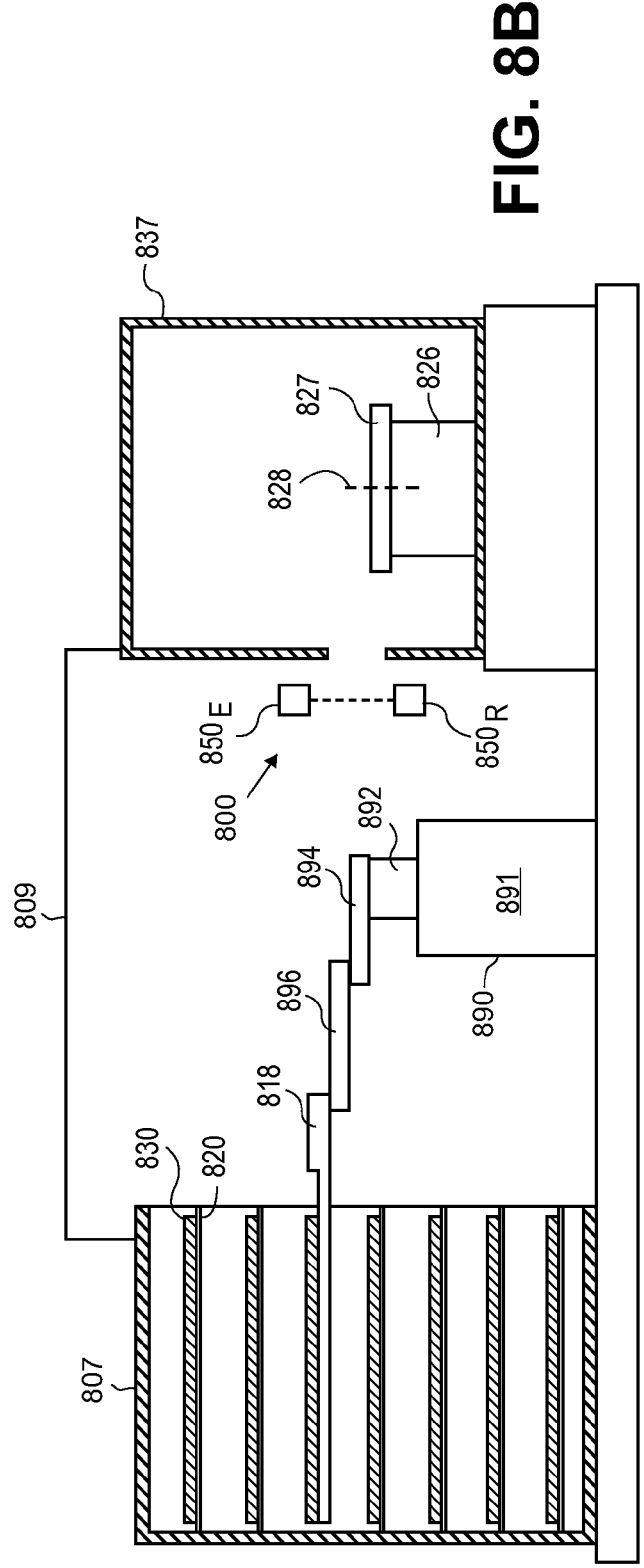
FIG. 8B is a cross-sectional illustration of a portion of the processing tool, according to an embodiment of the invention.

FIG. 8B is a schematic cross section of a portion of a process tool 801. As illustrated a plurality of carrier ring assemblies 830 are stored on slots 820 in a cassette within a load lock 807. A robot 890, such as a SCARA robot substantially similar to robot 190 described above, is positioned within transfer chamber 809 of the process tool 801. An end effector 818 is rotatably attached to an end of arm 896. The end effector 818 is able to access the load lock 807 and the etch chamber 837. By way of example, the etch chamber 837 includes a chuck 827, such as an electrostatic or vacuum chuck supported by a pedestal 826. The process tool 801 may also include a position detection system 800 substantially similar to embodiments described herein. In an embodiment, the sensors 850 may be through beam sensors that include an emitter $850_E$ and a receiver $850_R$.

According to an embodiment of the invention, the end effector 818 picks up a carrier ring assembly 830 from a first location and transfers it to a second location. By way of example, the first location may be a slot 820 in the load lock 807 and the second position may be the chuck 827 of the etch chamber 837. According to an additional embodiment, the first location may be the chuck 827 and the second location may be the slot 820 in the load lock 807. In an embodiment the end effector 818 may include a through beam sensor comprising an emitter and a receiver formed on opposite prongs. In such embodiments, the end effector 818 may be indexed in the vertical direction proximate to the slots 820. Accordingly, the end effector 818 can detect the presence of a carrier ring assembly 830 on a slot 820 when an edge of the carrier ring assembly 830 breaks the through beam each time a carrier ring assembly 830 is passed. When a carrier ring assembly 830 is detected on a slot 820, the end effector may pick up the carrier ring assembly from the slot 820, as shown in FIG. 8B. As the end effector 818 advances a carrier ring assembly 830 from a first location to a second location, the carrier ring assembly 830 passes through a position detection system 800. By way of example, the position detection system 800 may include through beam sensors 850 and optionally a camera. The sensor transitions caused by portions of the carrier ring assembly 830 allow for the center point of a carrier ring 132, the center point of the substrate 122, and/or the angular rotation θ of the carrier ring 132 to be determined according to embodiments described herein. After the position is determined, the controller 195 instructs the end effector 818 to move an amount equal and opposite to the detected offset. Accordingly, as the end effector places the carrier ring assembly 830 at the second position it is properly aligned. For example, when the second position is the chuck 827, the center point of the carrier ring, or the center point of the substrate is centered with the centerline 828 of the chuck. Additionally, the carrier ring assembly 830 may be aligned with the proper angular rotation θ to fit through the opening into the chamber 837.

While the position detection system 800 is shown proximate to the opening of the chamber 837 in FIG. 8B, embodiments are not limited to such configurations. For example, the position detection system 800 may be located proximate to the first location, such as the load lock 807. The center point of the carrier ring, the center point of the substrate, and/or the angular rotation θ may be determined as the carrier ring assembly 830 is removed from the slot 820. The offsets from the reference point of the end effector 818 may be determined and stored for use when placing the carrier ring assembly 830 at the second position. Additional embodiments also include a position detection system 800 located proximate to the first location and the second location. In such embodiments, the center point of the carrier ring, the center point of the substrate, and/or the angular rotation θ may be determined as the carrier ring assembly 830 is picked up from the first location and as it is placed at the second location. Such embodiments, therefore, are able to account for any movement of the carrier ring assembly 830 relative to the end effector 818 as it is being transferred between locations.

Figure 9A:
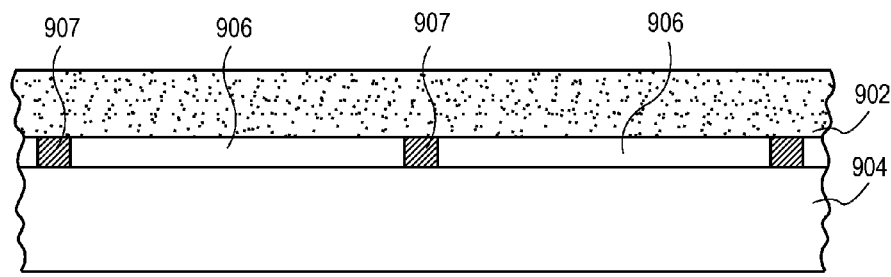
FIGS. 9A-9C illustrate cross-sectional views of a semiconductor wafer including a plurality of integrated circuits during a method of dicing a semiconductor wafer, according to an embodiment of the invention.
Figure 9B:
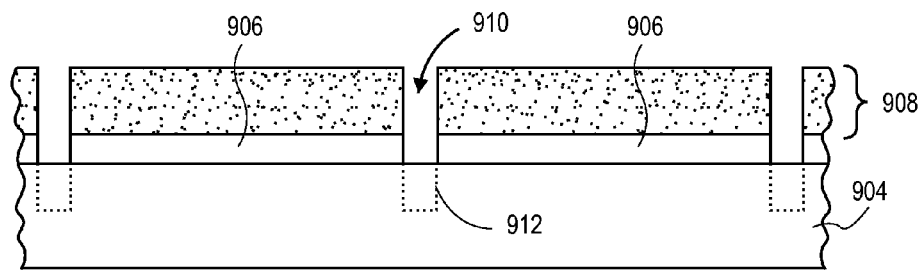
Figure 9C:
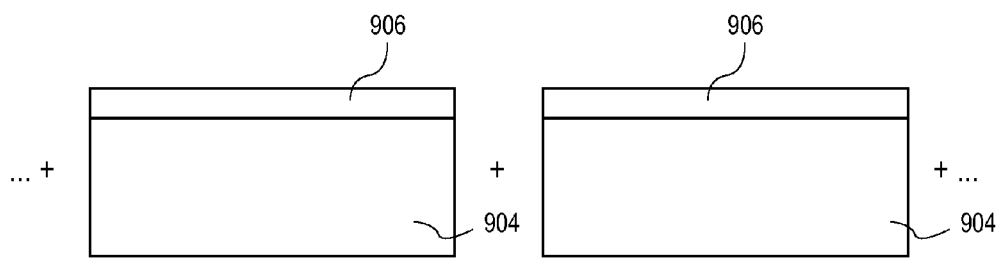

According to an embodiment, a hybrid laser and etch singulation process may include a process such as the one illustrated in FIGS. 9A-9C. Referring to FIG. 9A, a mask 962 is formed above a semiconductor wafer or substrate 964. The mask 962 is composed of a layer covering and protecting integrated circuits 966 formed on the surface of semiconductor wafer 964. The mask 962 also covers intervening streets 967 formed between each of the integrated circuits 966.

Referring to FIG. 9B, the mask 962 is patterned with a laser scribing process to provide a patterned mask 968 with gaps 970, exposing regions of the semiconductor wafer or substrate 964 between the integrated circuits 966. As such, the laser scribing process is used to remove the material of the streets 967 originally formed between the integrated circuits 966. In accordance with an embodiment of the present invention, patterning the mask 962 with the laser scribing process further includes forming trenches 972 partially into the regions of the semiconductor wafer 964 between the integrated circuits 966, as depicted in FIG. 9B.

Referring to FIG. 9C, the semiconductor wafer 964 is etched through the gaps 970 in the patterned mask 968 to singulate the integrated circuits 966. In accordance with an embodiment of the present invention, etching the semiconductor wafer 964 includes ultimately etching entirely through semiconductor wafer 964, as depicted in FIG. 9C, by etching the trenches 972 initially formed with the laser scribing process. In one embodiment, the patterned mask 968 is removed following the plasma etching, as is also depicted in FIG. 9C.

Accordingly, referring again to FIGS. 9A-9C, wafer dicing may be performed by initial ablation using a laser scribing process to ablate through a mask layer, through wafer streets (including metallization) and, possibly, partially into a substrate or wafer. Die singulation may then be completed by subsequent through-substrate plasma etching, such as through-silicon deep plasma etching.

Referring now to embodiments of the present invention may be provided as a computer program product, or software, that may include a machine-readable medium having stored thereon instructions, which may be used to program a computer system (or other electronic devices) to perform a process according to embodiments of the present invention. In one embodiment, the computer system is coupled with process tool 801 described in association with FIG. 8A or with the controller 195 of a wafer handling robot 190 described in association with FIG. 1B. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 10:
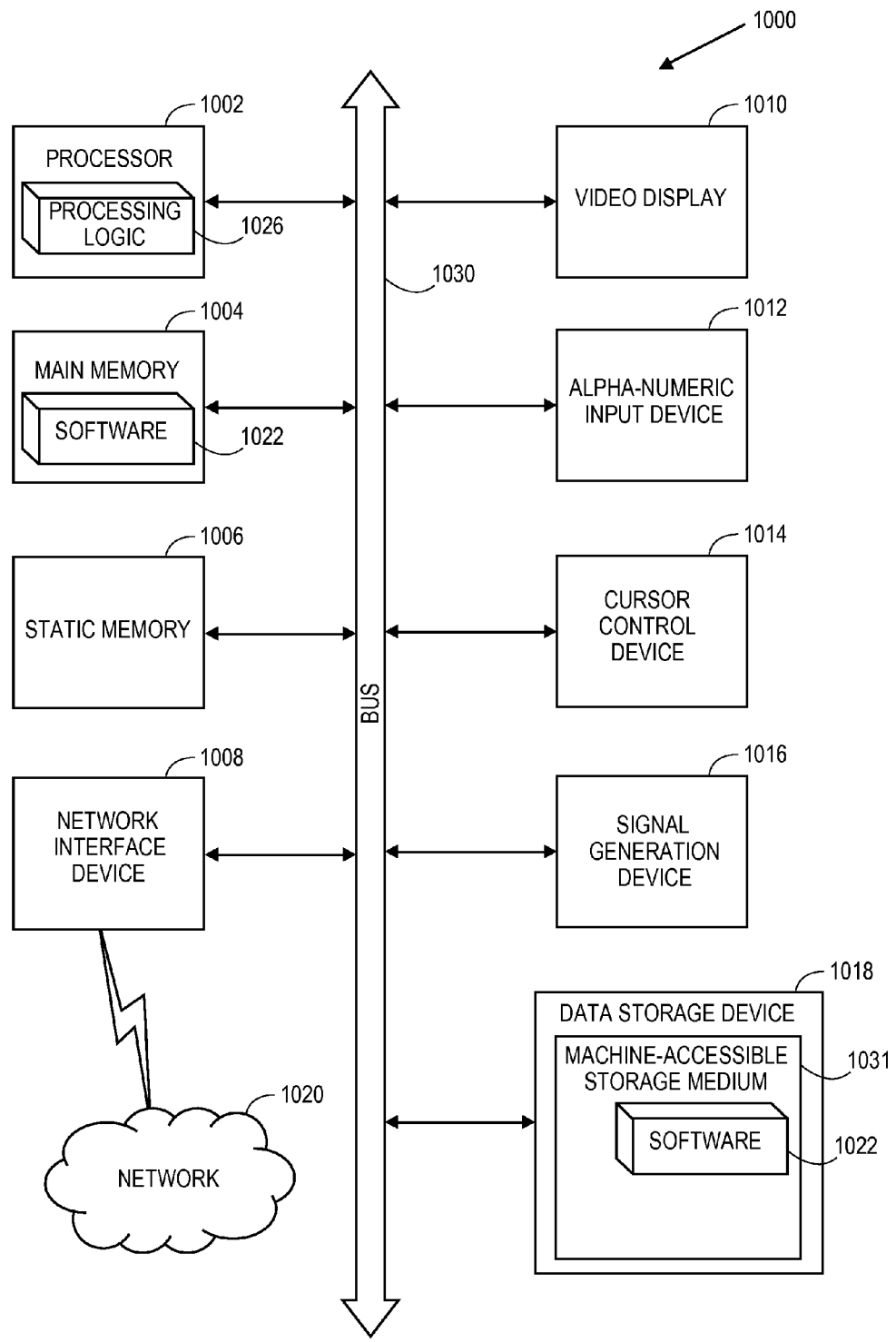
FIG. 10 illustrates a block diagram of an exemplary computer system, according to an embodiment of the invention.

FIG. 10 illustrates a diagrammatic representation of a machine in the exemplary form of a computer system 1000 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1030.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations described herein.

The computer system 1000 may further include a network interface device 1008. The computer system 1000 also may include a video display unit 1010 (e.g., a liquid crystal display (LCD), a light emitting diode display (LED), or a cathode ray tube (CRT)), an alphanumeric input device 1012 (e.g., a keyboard), a cursor control device 1014 (e.g., a mouse), and a signal generation device 1016 (e.g., a speaker).

The secondary memory 1018 may include a machine-accessible storage medium (or more specifically a computer-readable storage medium) 1031 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface device 1008.

While the machine-accessible storage medium 1031 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

In accordance with an embodiment of the present invention, a machine accessible storage medium has instructions stored thereon which cause a data processing system to perform a method of sensing and correcting the position of a carrier ring assembly supported by an end effector. The method includes passing the carrier ring assembly through a plurality of through beam sensors. The method further includes detecting a plurality of sensor transitions along points on the carrier ring assembly. Each sensor transition indicates that one of the plurality of through beam sensors change from an unblocked state to a blocked state, or changed from a blocked state to an unblocked state. The method further includes recording a position of the end effector at each sensor transition and associating the recorded end effector position with the sensor transition that caused the end effector position to be recorded. The method further includes calculating a position of the carrier ring assembly with the plurality of sensor transitions and their associated end effector positions.

What is claimed is:

1. A method of determining a position of a carrier ring assembly supported by an end effector, comprising:
    passing the carrier ring assembly supported by the end effector through a field of vision of a camera;
    obtaining an image of the carrier ring assembly and the end effector from the camera;
    determining a center point of the carrier ring assembly relative to a center point of the end effector from the image obtained from the camera.

2. The method of claim 1, wherein the carrier ring assembly comprises a carrier ring having a layer of adhesive backing tape surrounded by the carrier ring, and a substrate supported by the backing tape.

3. The method of claim 2, further comprising, determining a center point of the substrate relative to the center point of the carrier ring assembly with a second camera.

4. The method of claim 3, wherein the center point of the substrate relative to the center point of the carrier ring assembly is determined with the second camera prior to the carrier ring assembly being supported by the end effector.

5. The method of claim 3, wherein the adhesive backing tape is not transparent.

6. The method of claim 5, wherein the carrier ring has one or more flat edges and one or more curved edges.

7. The method of claim 6, further comprising determining an angle of rotation of the carrier ring assembly by detecting a plurality of sensor transitions along points on the carrier ring assembly, wherein each sensor transition indicates that one of a plurality of through beam sensors changed from an unblocked state to a blocked state, or changed from a blocked state to an unblocked state.

8. The method of claim 6, further comprising determining an angle of rotation of the carrier ring assembly relative to the end effector with the image from the camera.

9. A method for transferring a carrier ring assembly from a first location to a second location, comprising:
    lifting a carrier ring assembly from a first location with an end effector;
    passing the carrier ring assembly supported by the end effector through a field of vision of a camera;
    obtaining an image of the carrier ring assembly and the end effector from the camera;
    determining a position of the carrier ring assembly with respect to the end effector position from the image obtained from the camera;
    calculating an end effector corrective movement based on the position of the carrier ring assembly.

10. The method of claim 9, wherein the first location is a FOUP and the second location is a chuck in a plasma processing chamber.

11. The method of claim 9, wherein the carrier ring assembly comprises a carrier ring having a layer of adhesive backing tape surrounded by the carrier ring, and a substrate supported by the backing tape.

12. The method of claim 11, further comprising, determining a center point of the substrate relative to the center point of the carrier ring assembly with a second camera.

13. The method of claim 12, wherein the center point of the substrate relative to the center point of the carrier ring assembly is determined with the second camera prior lifting the carrier ring assembly from the first location with the end effector.

14. The method of claim 12, wherein the end effector corrective movement is further based on the center point of the substrate relative to the center point of the carrier ring assembly.

15. A system for determining the position of a carrier ring assembly, comprising:
    a robot with an end effector for supporting the carrier ring assembly;
    a camera that includes a field of vision that is large enough to obtain an image of the end effector and the carrier ring assembly; and a controller that is communicatively coupled to the robot and the camera, wherein the controller obtains an image of the end effector from the camera, and wherein the controller determines a position of the carrier ring assembly with respect to a position of the end effector from the image.

16. The system of claim 15, wherein the robot includes a selective compliance articulated robot arm.

17. The system of claim 15, further comprising a plurality of through beam sensors that are communicatively coupled to the controller, and wherein the controller records a position of the end effector when a sensor changes state from an unblocked state to a blocked state, or from a blocked state to an unblocked state.

18. The system of claim 15, wherein the controller is integrated into a processing tool.

19. The system of claim 15, wherein the end effector includes two prongs.

20. The system of claim 19, wherein the end effector includes a through beam sensor, wherein a first prong includes an emitter, and a second prong includes a receiver.

* * * * *